United States Patent [19]
Koiwai

[11] Patent Number: 5,678,110
[45] Date of Patent: Oct. 14, 1997

[54] CARTRIDGE LOADING CHAMBER OF CAMERA

[75] Inventor: Tamotsu Koiwai, Akikawa, Japan

[73] Assignee: Olympus Optical Co., Ltd., Tokyo, Japan

[21] Appl. No.: 622,951

[22] Filed: Mar. 27, 1996

Related U.S. Application Data

[63] Continuation of Ser. No. 372,544, Jan. 13, 1995, abandoned.

[30] Foreign Application Priority Data

Jan. 17, 1994 [JP] Japan .................. 6-003102

[51] Int. Cl.$^6$ ........................................ G03B 17/02
[52] U.S. Cl. .................. 396/535; 396/536; 396/538
[58] Field of Search .............................. 396/360, 439, 396/511, 512, 535, 536, 538

[56] References Cited

U.S. PATENT DOCUMENTS

| | | | |
|---|---|---|---|
| 3,543,664 | 12/1970 | Kremp | 354/288 |
| 4,095,249 | 6/1978 | Miura | 354/288 |
| 4,332,453 | 6/1982 | Seely et al. | 354/288 |
| 4,339,193 | 7/1982 | Harvey | 354/288 |
| 4,669,845 | 6/1987 | Ishiguro | 354/288 |
| 5,155,514 | 10/1992 | Tamamura | 354/174 |
| 5,179,402 | 1/1993 | Komatsuzaki | 354/212 |
| 5,255,034 | 10/1993 | Shimada et al. | 354/173.1 |
| 5,258,793 | 11/1993 | Tsuji et al. | 354/288 |
| 5,307,101 | 4/1994 | Tanii et al. | 354/173.1 |
| 5,323,201 | 6/1994 | Richiuso et al. | 354/288 |

FOREIGN PATENT DOCUMENTS

| 4-1624 | 1/1992 | Japan . |
|---|---|---|
| 4-70637 | 3/1992 | Japan . |

Primary Examiner—Safet Metjahic
Assistant Examiner—Eddie C. Lee
Attorney, Agent, or Firm—Kenyon & Kenyon

[57] ABSTRACT

A camera loading chamber into which a film cartridge is loaded by dropping the cartridge into an opening of the camera against the urging force of an urging member. The film cartridge is held within the loading chamber by a trapdoor which is closed over the loaded cartridge and held in its closed position by a locking mechanism. Upon releasing the locking mechanism, the cartridge is urged toward the exterior of the camera and causes the trapdoor to open under the urging force of the urging member. A stopping member causes the trapdoor to stop at a position between its closed position and its fully open position so that the cartridge is prevented from jumping out of the cartridge loading chamber.

11 Claims, 3 Drawing Sheets

CARTRIDGE LOADING CHAMBER OF CAMERA

This application is a continuation of application Ser. No. 08/372,544, filed on Jan. 13, 1995, now abandoned.

FIELD OF THE INVENTION

The present invention relates generally to a cartridge loading chamber of a camera, and more particularly to a loading chamber of a camera for loading and unloading a small film cartridge of a self-sending type.

BACKGROUND INFORMATION

Various film loading chambers for cameras are known. For example, Japanese Laid-Open Patent Application Publication No. 4-1624 describes an apparatus including a lid for closing an opening in which a film cartridge is received and a link mechanism which is responsive to the opening of the lid for shifting the film cartridge to a position where the cartridge is easily removed.

Japanese Laid-Open Patent Application Publication No. 4-70637 describes an apparatus for delaying the opening movement of a lid biased by a spring and for thrusting a film cartridge by a cam mechanism biased toward the exterior of the camera.

The complex structure of the link mechanism described in Japanese Laid-Open Patent Application Publication No. 4-1624, however, entails higher production costs and occupies a larger space. Furthermore, the apparatus of Japanese Laid-Open Patent Application Publication No. 4-70637 requires considerable time to unload the film cartridge because of the time delay in the opening motion of the lid. Additionally, as with the mechanism of Japanese Laid-Open Patent Application Publication No. 4-1624, the structure of the apparatus of Japanese Laid-Open Patent Application Publication No. 4-70637 is complex and thus costlier to produce.

SUMMARY OF THE INVENTION

An object of the present invention is to provide a cartridge loading chamber of a camera from which a film cartridge can be easily removed without jumping out, and which has a simple structure that can be produced at low cost.

For achieving this object, the cartridge loading chamber of the camera in accordance with the present invention comprises a click means for defining a click stop position of a lid member which is between an open and a closed position of the lid member. As a result, the film cartridge can be urged out of the camera's cartridge chamber by a spring for easy unloading without jumping out from the camera.

These and other advantages and features of the present invention will become readily apparent to those skilled in the art after reading the following detailed description of the invention and studying the accompanying drawings.

DETAILED DESCRIPTION

A preferred embodiment of the present invention will be explained below with reference to the accompanying drawings.

Figure 1:
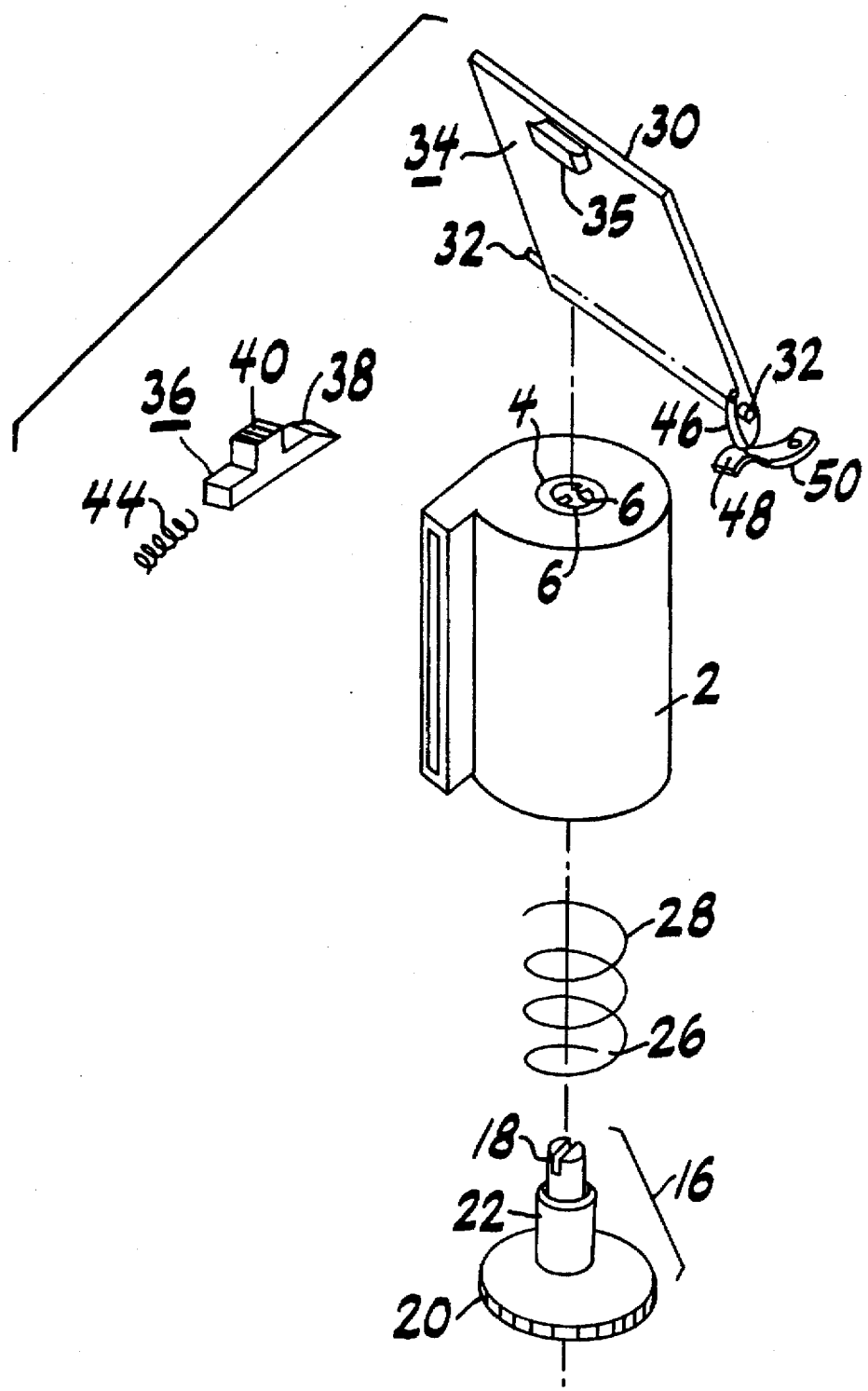
FIG. 1 shows an exploded perspective view of selected parts of an embodiment of the present invention.

FIG. 1 shows a small cartridge 2 containing a film strip therein. A spool shaft (not shown) is provided in the cartridge for coiling the film strip and for sending out and winding up the film strip. A connecting portion 4 is formed at both ends of the spool shaft. A pair of coupling claws 6 is provided on the inner surface of the connecting portion 4.

Figure 2:
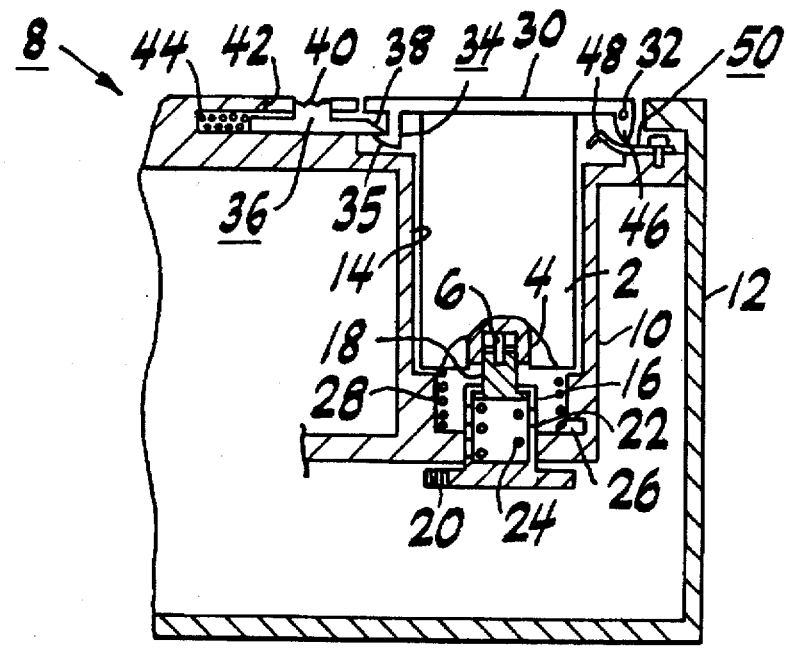
FIG. 2 shows a cross section of the embodiment partially illustrated in FIG. 1 in which a lid is in a first position.

As shown in FIG. 2, a camera 8 has a camera body (hereinafter referred to as "the body") 10, 12. A cartridge chamber 14 for loading a film cartridge 2 is provided in the body 10. A round opening is formed in a bottom face of the cartridge chamber 14, and a drive fork 16 projects from the opening. The drive fork 16 has a fork member 18. The tip portion of the fork member 18 fits in the connecting portion 4 to engage with the coupling claws 6. The fork member 18 is provided in a housing 22 fixed to a top face of a gear 20, for rotating with the gear 20. A spring 24 is provided in the housing 22 to urge the fork member 18 upward. The gear 20 is connected to a film feeding mechanism (not shown) in a lower region of the body 10. An ejection spring 28 having a fixing portion 26 fixed to the body 10 is provided on the outer periphery of the drive fork 16. The ejection spring 28 acts as an urging means for urging the film cartridge toward the outside of the camera.

Figure 4:
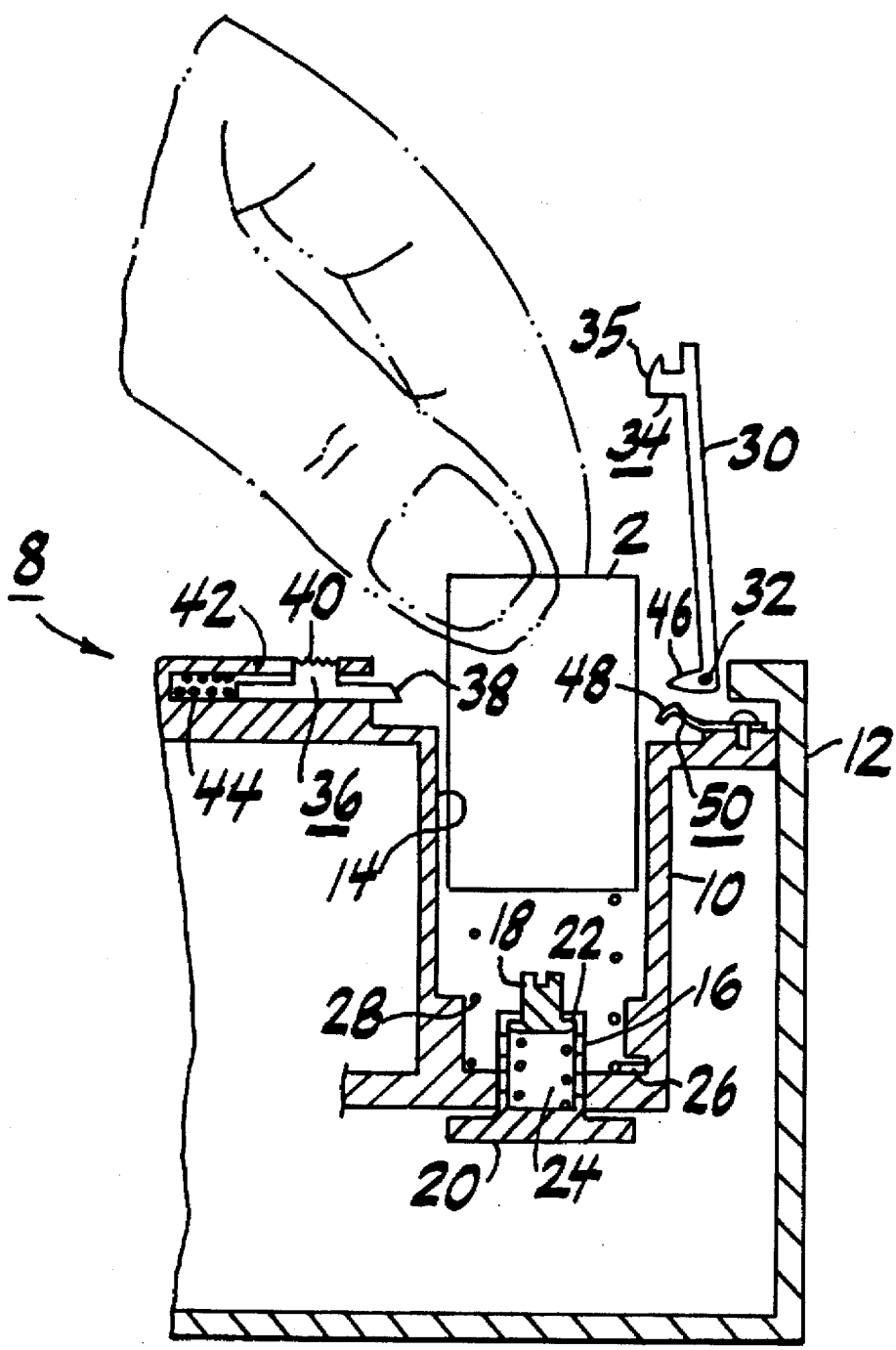
FIG. 4 shows a cross section of the embodiment partially illustrated in FIG. 1 in which the lid is in a third position.

A trapdoor or lid 30 for opening and closing the cartridge chamber 14 is arranged at the top of the cartridge chamber 14. The lid 30 is rotatably coupled to the body 10 by a pin 32 so that the lid can be rotated about the pin 32 between a first, closed position, as depicted in FIG. 2, and a second, open position, as depicted in FIG. 4. As shown in FIGS. 1 and 2, a hook-like coupling claw 34 is arranged at the center of the top edge of the lid 30. A bent surface 35 is formed on the lower face of the coupling claw 34. A stopper 36 is provided at a position where it faces the coupling claw 34 when the lid 30 is in the first position, as shown in FIG. 2. The stopper 36 is arranged slidably in a horizontal groove formed in the body 10. A slant 38 is formed in the tip portion of the stopper 36 so as to be smoothly slidable on the bent surface 35.

Figure 3:
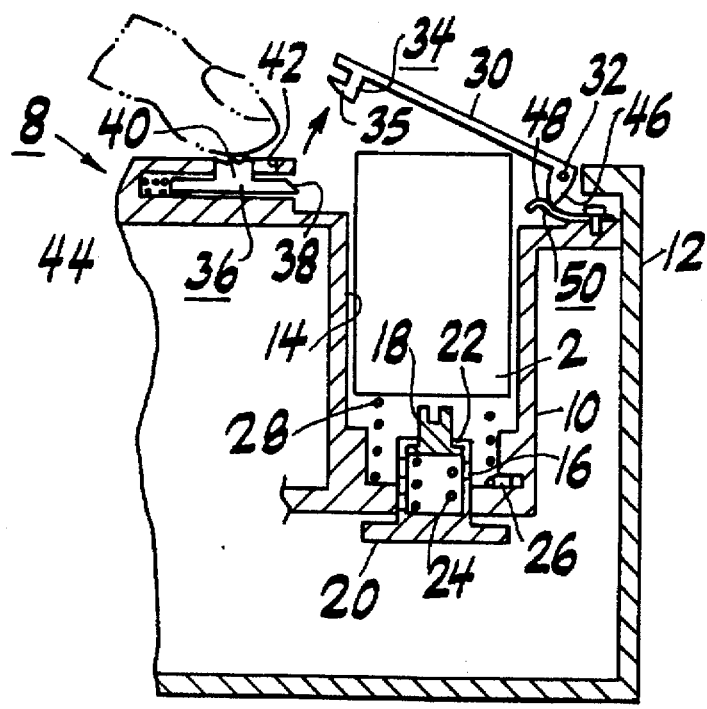
FIG. 3 shows a cross section of the embodiment partially illustrated in FIG. 1 in which the lid is in a second position.

A knob 40 is formed on the upper face of the stopper 36. The knob 40 projects outward through an opening 42 formed in the upper wall of the body 10 and thus can be touched by a user's finger to slide the stopper 36, as shown in FIG. 3. A spring 44 is provided at the base end of the stopper 36. The stopper 36 is urged by the spring 44 so that the tip of the stopper 36 can contact the coupling claw 34. The stopper 36 and the spring 44 act as a lock means.

A click cam 46 having a cam surface with regard to the pin 32 is formed at the base end of the lid 30. A click spring 50 as an elastic means is fixed by a screw or the like to the upper face of the body 10. The urging force of the click spring 50 is greater than that of the ejection spring 28. A click portion 48 projecting upward is formed by bending the tip of the click spring 50. The click portion 48 acts as a projecting means or a hampering means, which contacts the click cam 46 when the lid 30 is opened or closed. When the click portion 48 of the click spring 50 contacts the click cam 46, the lid 30 stops at a predetermined position, such as a third position shown in FIG. 3. The click cam 46 and the click spring 50 form a click mechanism and act as a holding means and a stopping means. The click spring 50 may be a leaf spring made of metal or plastic and may be formed integrally with the body 10, 12 and in an elastically deformable shape.

The function of the cartridge chamber described above will be explained below. FIG. 2 shows the state in which the film cartridge 2 is loaded into the cartridge chamber 14. The film cartridge 2 is loaded into the cartridge chamber 14 downward, in a so-called "drop-in" manner. The fork member 18 of the drive fork 16 fits in the spool connecting portion 4 located at the bottom end of the film cartridge 2 and is rotated by the driving force from the gear 20 to send out and wind up the film.

As shown in FIG. 2, the ejection spring 28 is in a compressed state. The film cartridge 2 is urged by the ejection spring 28 to push up the lid 30. The stopper 36 is biased to the right by the force of the spring 44 so that the tip of the stopper 36 is kept in engagement with the coupling claw 34. Thus, the lid 30 is retained in the first position as shown in FIG. 2. The lid 30 receives no resistance force from the click spring 50 since the click cam 46 of the lid 30 is not in contact with the click portion 48.

Unloading the film cartridge 2 after rewinding the exposed film into the film cartridge 2 will be described below with reference to FIGS. 3 and 4. First, the knob 40 of the stopper 36 is slid to the left against the urging force of the spring 44, then the tip of the stopper 36 is released from the coupling claw 34 of the lid 30. After releasing, the film cartridge 2 is urged up by the ejection spring 28 to push up the lid 30. The click cam 46 of the lid 30 rotates in a clockwise direction to contact the click portion 48 of the click spring 50. Since the force of the click spring 50 is greater than that of the ejection spring 28, the contact of the click cam 46 with the click portion 48 stops the opening motion of the lid 30, and the lid 30 is held in the third position, as shown in FIG. 3. As a result, the lid 30 in the third position prevents the film cartridge 2 from jumping out of the cartridge chamber 14 under the urging force of the ejection spring 28. When the force of the click spring 50 is balanced with that of the ejection spring 28, the state shown in FIG. 3 is achieved.

Next, as shown in FIG. 4, when the lid 30 is manually moved to the second, open position against the click spring 50, the click cam 46 of the lid 30 surmounts the click portion 48. When the lid 30 is opened, the film cartridge 2 is further thrust upward by the ejection spring 28. Thus, the film cartridge 2 projecting from the upper face of the cartridge chamber 14 can be grasped and pulled out.

In the case of loading the film cartridge, the operation described above is reversed. That is, the film cartridge 2 is dropped into the cartridge chamber 14 when the lid 30 is opened, as shown in FIG. 4. The lid 30 is then closed against the ejection spring 28 to push down the cartridge 2. The bent surface 35 of the coupling claw 34 of the lid 30 contacts the slant 38 formed on the tip of the stopper 36 and causes the stopper 36 to slide against the biasing force of the spring 44. Once the coupling claw 34 surmounts the tip of the stopper 36, the stopper 36 is urged by the spring 44 to slide to the right again so that the tip of the stopper 36 is coupled with the coupling claw 34 and the lid 30 is locked in its closed state.

The coupling button for closing the lid 30 is not limited to that of the illustrated embodiment and may be replaced by other similar means. The click means for closing the lid 30 is not limited to a leaf spring and may be replaced by the combination of a ball and a groove etc. which has a similar function.

The above described preferred embodiments are intended to illustrate the principles of the invention, but not to limit the scope of the invention. Various other embodiments and modifications to these preferred embodiments may be made by those skilled in the art, without departing from the scope of the following claims.

What is claimed is:

1. A cartridge loading chamber of a camera, comprising:
   a coil spring provided in a bottom portion of the cartridge loading chamber for urging a film cartridge loaded in the camera toward the exterior of the camera;
   a trapdoor member rotatably coupled at a first end portion thereof to the camera so that the trapdoor member can swing between open and closed positions, the trapdoor member having at a second end portion thereof a lock member, the trapdoor member preventing the film cartridge loaded in the camera from jumping out of the camera;
   a stopper member provided on the camera at a position facing the lock member for keeping the trapdoor member closed and for releasing the trapdoor member in response to a manual release operation; and
   click means for defining a clicked stop position of the trapdoor member between the open and closed positions so that the film cartridge loaded in the camera can be held at a predetermined position when releasing the stopper member,
   wherein the film cartridge loaded in the chamber pushes the trapdoor member open when the trapdoor member is released by the stopper member.

2. The cartridge loading chamber according to claim 1, wherein the click means comprises:
   a projection member integral with the trapdoor member; and
   a hampering member arranged on the camera for hampering the swing of the trapdoor member by being elastically deformed by the projection member.

3. The cartridge loading chamber according to claim 2, wherein the hampering member has an urging force greater than that of the urging means.

4. An apparatus for unloading a film cartridge from a cartridge loading chamber of a camera, comprising:
   a lid member swingably movable from a closed position for closing an opening of the loading chamber to a fully open position for loading and unloading the film cartridge, the lid member preventing the film cartridge loaded in the camera from jumping out of the camera;
   a coil spring provided in a bottom portion of the cartridge loading chamber for urging the film cartridge toward the exterior of the camera, wherein the film cartridge urged by the coil spring urges the lid member to open;
   locking means for locking the lid member at the closed position against the Urging of the film cartridge loaded in the cartridge loading chamber; and
   retainer means for retaining the lid member at a position between the closed position and the fully open position when the locking means is released so that the film cartridge loaded in the camera can be held at a predetermined position from which the film cartridge can be removed by hand.

5. The apparatus according to claim 4, wherein the retainer means includes a projection means which swings along with the lid member, and means for hampering the swing of the projection means.

6. An apparatus for removing a film cartridge from a cartridge loading chamber of a camera, comprising:
   a lid member swingably movable from a closed position for closing an opening of the loading chamber to a fully open position for loading and unloading the film cartridge, the lid member preventing the film cartridge loaded in the camera from jumping out of the camera;

a coil spring provided in a bottom portion of the loading chamber for urging the film cartridge toward the exterior of the camera, wherein the film cartridge urged by the coil spring urges the lid member to open;

locking means for locking the lid member at the closed position; and stopper means for stopping the lid member at a position between the closed position and the fully open position when the locking means is released so that the film cartridge loaded in the camera can be held at a predetermined position.

7. The apparatus according to claim 6, wherein the stopper means includes a projection member which swings along with the lid member, and an elastic member for resisting the swing of the projection member by elastic deformation.

8. The apparatus according to claim 7, wherein the projection member has a common center of swing with the lid member.

9. The apparatus according to claim 7, wherein the projection member has a tip with a cam profile.

10. The apparatus according to claim 7, wherein the elastic member has a click position that can be surmounted by the projection member.

11. The apparatus according to claim 6, wherein the stopper means includes a click mechanism including a cam and a spring arranged near a swing axis of the lid member.

* * * * *

UNITED STATES PATENT AND TRADEMARK OFFICE
CERTIFICATE OF CORRECTION

PATENT NO. : 5,678,110
DATED : October 14, 1997
INVENTOR(S) : Tamotsu KOIWAI

It is certified that error appears in the above-indentified patent and that said Letters Patent is hereby corrected as shown below:

Column 4, line 51, change "Urging" to --urging--.

Signed and Sealed this

Ninth Day of March, 1999

Attest:

Q. TODD DICKINSON

*Attesting Officer*  Acting Commissioner of Patents and Trademarks